March 2, 1926. 1,575,485
W. J. HOLMAN ET AL
LISTER ATTACHMENT
Filed August 14, 1925  2 Sheets-Sheet 1
Fig. 1.
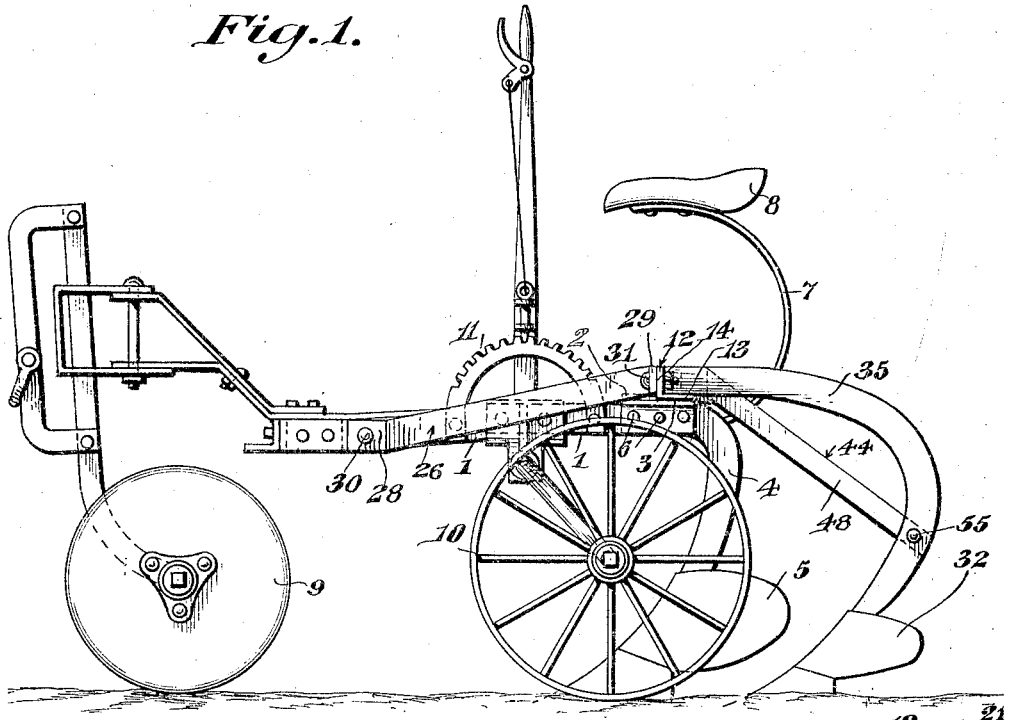
Fig. 3.
Fig. 4.
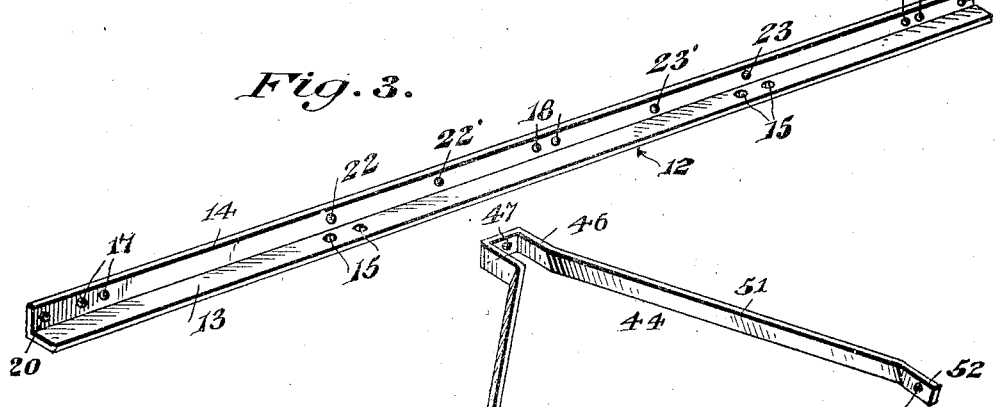
INVENTORS.
W. J. Holman
AND G. L. Hayward,
BY Geo. F. Kimmel, ATTORNEY.

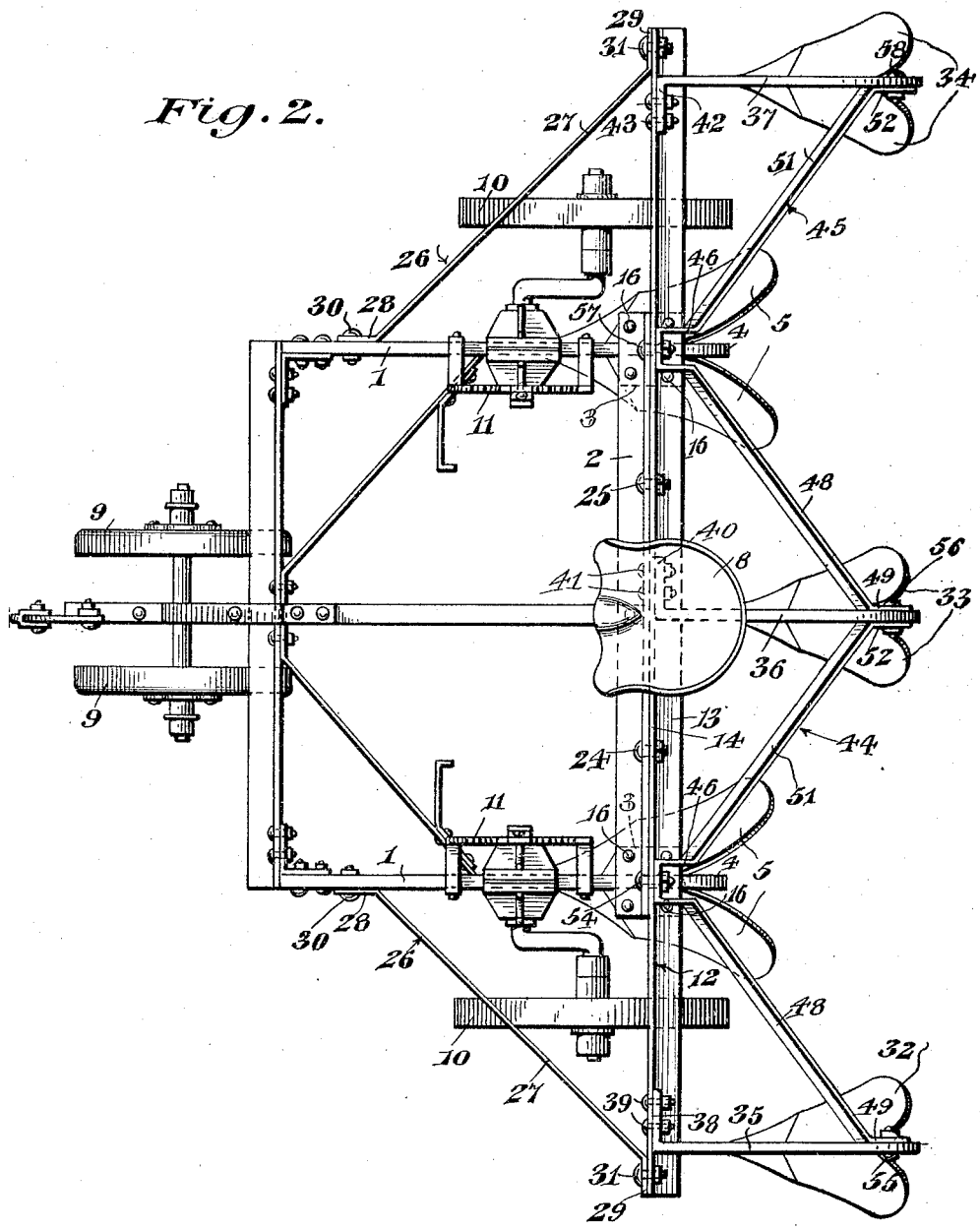

Patented Mar. 2, 1926.

1,575,485

UNITED STATES PATENT OFFICE.

WILLIAM J. HOLMAN, OF HUGOTON, AND GEORGE L. HAYWARD, OF ROLLA, KANSAS.

LISTER ATTACHMENT.

Application filed August 14, 1925. Serial No. 50,280.

*To all whom it may concern:*

Be it known that we, WILLIAM J. HOLMAN and GEORGE L. HAYWARD, citizens of the United States, residing at Hugoton, in the county of Stevens and State of Kansas, and Rolla, in the county of Morton and State of Kansas, respectively, have invented certain new and useful Improvements in Lister Attachments, of which the following is a specification.

This invention relates to a lister attachment designed primarily for use in connection with a "Wheatland" lister, but it is to be understood that a lister attachment, in accordance with his invention, can be employed in connection with any type of lister for which it is found applicable, and the invention has for its object to provide, in a manner as hereinafter set forth, a lister attachment for following one or more lister ridges formed by the lister and for splitting said ridges in a manner to provide five very small furrows to leave the ground in uniform shape ready for drilling, and whereby the ground will be prepared in one operation ready for wheat planting and further in a condition to avoid blowing and shifting, making it easy to follow with the drill for planting.

A further object of the invention is to provide, in a manner as hereinafter set forth, a lister attachment for the purpose referred to and which when active will provide for a material saving in time when treating the ground, over the time now required in the method now employed to prepare the ground for wheat planting.

Further objects of the invention are to provide, in a manner as hereinafter set forth, a lister attachment which is simple in its construction and arrangement, strong, durable, thoroughly efficient in its use, readily installed with respect to a lister, and inexpensive to manufacture.

The attachment, in accordance with this invention, is designed to attach to any form of common standard lister from one, double or three or more row listers, or to what is known as a single or double lister, thus making the device in different sizes to be attached to such listers.

An attachment, in accordance with this invention is such that it may be made in not only sizes for a single and double or larger lister but made in smaller sizes for the purpose of preparing the ground ready for planting all other seeds, and to be hitched or fastened to any kind of a listing device that might be used for small seeds. However, it is primarily designed for summer fallowing or preparing the ground for wheat and for sub-soiling. leveling and slightly ridging the land to prevent blowing and leave a good deep bed that helps subserve and hold the moisture, thus permitting the preparation of the ground early in the season as the wheat is cut with header or combine, shaping the soil in the best possible manner to retain the rains of the early season and preparing the ground as a proper seed bed, so that during the ordinary months of July and August there is nothing to do in the preparation of the soil except harrowing if necessary, previous to the planting of the wheat in September which is the planting season.

The attachment for listers, in accordance with this invention, is to contain two or more diamond mould-board and shear listers made in various sizes which are smaller and different shape than listers now used. These mould-board listers are so attached to the beam as to be adjustable at different angles in order that the soil may be properly plowed and leveled, so designed that the mould-board can be adjusted forward or backward and up and down on the beam to the desired use, and to conform to the character of the soil in which it is used, the average hard ground requiring the adjustment downward and the loose soil requiring an upward adjustment of the mouldboards.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a lister, showing the adaptation therewith of a lister attachment in accordance with this invention.

Figure 2 is a top plan view of a lister, showing the adaptation therewith of a lister attachment in accordance with this invention.

Figure 3 is a perspective view of a coupling member forming an element of the attachment.

Figure 4 is a perspective view of a brace element for a pair of lister beams.

The adaptation of a lister attachment, in accordance with this invention, is shown by way of example in connection with a well-known form of lister provided with a pair of lister plows, and referring to the drawings, 1 indicates the frame of the lister formed of a front, a pair of sides and a rear bar, and the latter is indicated at 2 and seated on the rear ends of the side bars of the frame. An angle iron 3 is secured to the outer and inner sides of each side bar of the frame, at the rear end thereof, and projects rearwardly therefrom and is arranged below the rear bar 2. The beam 4 of each plow 5 is secured to the rear of the frame 1, at each side thereof, by the hold-fast devices 6. The rear bar 2 carries a post 7 provided with a seat 8. The front wheels of the lister are indicated at 9, the rear wheels at 10, and the lever mechanisms for controlling the depth of the plows 5 are indicated at 11. The foregoing is a brief description of the form of lister now in general use and it is thought unnecessary to further specifically refer to the same, as the attachment in accordance with this invention is connected with the frame 1 of the lister.

A lister attachment, in accordance with this invention, comprises a combined extension and coupling member and by way of example the said member is shown as consisting of an angle bar 12, positioned against the rear face of the rear bar 2 of the frame 1 and projecting a substantial distance laterally from each of the side bars of the frame 1.

The horizontal leg of the member 12 is indicated at 13 and the vertical leg at 14. The leg 13 is formed with two pair of openings 15. The openings of each pair are arranged in close proximity to each other and through the openings of each pair 15 extend hold-fast devices 16 for securing the leg 13 to the angle irons 3. The vertical leg 14 is formed with three pairs of openings 17, 18 and 19. The pair 17 is positioned in close proximity to one end of the leg 14, and the pair 19 in proximity to the other end of the leg 14. An opening 20 is formed in the leg 14 between the pair of openings 17 and one end thereof but nearer to the end than to the pair of openings 17. An opening 21 is formed in the leg 14 between the pair of openings 19 and the other end thereof but nearer to such end than to the pair of openings 19. The leg 14, between the pairs of openings 17 and 18, is provided with spaced openings 22, 22' and with the opening 22 disposed centrally with respect to one pair of openings 15. The leg 14, between the pairs of openings 18 and 19, is provided with a plurality of openings 23, 23', and with the opening 23 disposed centrally with respect to the other pair of openings 15. The leg 14 is secured to the vertical leg of the rear bar 2 of the lister frame by a pair of hold-fast devices 24, 25, one of which extends through the opening 22' and the other of which extends through the opening 23' in the leg 14. By this arrangement the member 12 is not only secured to the angle irons 3, but also to the rear bar 2, whereby the said member 12 is fixedly secured with the frame 1 so that when the lister plows 5 are adjusted the member 12 will be carried with the frame.

The member 12 is furthermore connected with the frame 1 as well as braced with respect thereto, through the medium of a pair of oppositely extending inclined brace bars referred to generally by the reference character 26, and each of which consists of an inclined intermediate portion 27 and a pair of end portions 28, 29. The end portion 28 is positioned against and disposed in parallelism with respect to a side bar of the frame 1 and is further secured therewith by the hold-fast device 30. The end portion 29 is positioned against the forward face of the leg 14, and is disposed in parallelism with respect thereto and is secured therewith by a hold-fast device 31. One of the hold-fast devices extends through the opening 20 and the other through the opening 21 formed in the leg 14.

Three lister plows form elements of the attachment and which are indicated at 32, 33 and 34, and each of which is of the small diamond point type. The lister plow 33 is disposed centrally with respect to the lister plows 5 and furthermore arranged centrally with respect to the member 12. The lister plow 32 is positioned outwardly with respect to one of the plows 5 and the lister plow 34 positioned outwardly with respect to the other plow 5. The distance between the plows 32, 33 and 34 is the same, and the plows 32, 33 are spaced equidistant from one of the plows 5, and the plows 33 and 34 are spaced equidistant from the other of the plows 5. The plows 32, 33 and 34 are spaced equidistant rearwardly with respect to the plows 5.

The beam of the plow 32 is indicated at 35, that of the plow 33 at 36, and the beam for the plow 34 at 37. The beams are of curvilinear form and project forwardly towards the member 12 and are seated on the leg 13 of the latter. The forward end of the beam 35 is provided with an inwardly extending right angularly disposed terminal portion 38 which abuts against the rear face of the leg 14 and is secured thereto by a pair of hold-fast devices 39, which extend through the opening 17. The forward end of the beam 36 is provided with a right angularly disposed terminal portion 40, which abuts against the rear face of the leg 14 and is secured thereto by a pair of hold-fast devices 41, which extend through the openings 18. The forward end of the beam 37 is formed with an inwardly extending right angularly disposed terminal portion 42, which abuts against the rear face of the leg 14 and is secured thereto by a pair of hold-fast devices 43, which extend through the openings 19.

Arranged between the beams 35 and 36 is a brace element referred to generally by the reference character 44, and arranged between the beams 36 and 37 is a brace element, referred to generally by the reference character 45. The brace elements are secured to the member 12 and also to the beams 35, 36 and 37, and as each of the brace elements is of the same construction, but one will be described as the description of one will apply to the other. Each of the brace elements comprises a yoke-shaped forward portion 46, having its head provided with an opening 47. Extending from one of the arms of the portion 46 is an outwardly disposed and downwardly inclined arm 48 merging into a straight portion 49, formed with an opening 50, and extending from the other arm of the portion 46 is an outwardly disposed and downwardly inclined arm 51 terminating in a straight portion 52 formed with an opening 53. The portions 49 and 52 are disposed in parallelism. The yoke-shaped portion of the element 44 is seated on the leg 13, between the openings 15 and is secured to the leg 14 by a hold-fast device 54, which extends through the openings 22 and 47. The portion 50 of the brace element 44 is secured to the inner face of the beam 35, in proximity to the plow 32 by a hold-fast device 55, which extends through the beam 25 and through the opening 50. The portion 52 of the element 44 is secured to the beam 36, in proximity to the plow 33, by a hold-fast device 56, which extends through the beam 36 and opening 53. The yoke-shaped forward portion 46 of the element 45 is seated on the leg 13 between the other pair of openings 15 and abuts against the rear face of the leg 14 and is secured to the latter by a hold-fast device 57, which extends through the openings 23 and 47. The portion 50 of the element 45 is secured to the other side of the beam 36 by the hold-fast devices 56, which extend through the opening 54, and the portion 52 of the brace element 45 is secured to the inner side of the beam 37 in proximity to the plow 34, by a hold-fast device 58, which extends through the beam 37 and opening 53.

In the lister ridge formed by the plows 5 and 6, the center of the ridge is created just ahead of the attachment forwardly of lister 33. So that lister 33 comes in contact with the center of the ridge is partially split, and the dirt is again partially turned back toward listers 5 and 6, leaving a small furrow between the furrows formed by listers 5 and 6. While this is done, the special type of listers 32 and 34 throw the dirt toward lister 33 as well as outward from listers 32 and 34, thus creating the splitting of the ridge, the sledding and harrowing features, leaving the surface of the ground slightly ridged, which afterwards being crossed at right angles with the drill or with a disk harrow permits the ground to maintain the general surface condition to prevent blowing to receive and retain moisture, that mulching with disk-harrow after a rain helps to subserve the moisture as well as destroy weeds before planting if planting season should be late, because the deeper bed has already been created by the large standard listers, and the sub-packing process is created by the use of the special type of attachment listers which do not dig as deep in the ground but turn it and slightly level it, while a subsequent disk or tooth harrow mulches the surface, and destroys weeds, unless planting is favorable immediately after the use of this lister with the attachment.

One feature of the sub-soil of this bed might be explained. The ground is torn wider and deeper by the listers 5 and 6 while by listers 32, 33 and 34 it is torn at a higher elevation and overlaps the deeper furrows in such a way that the underneath surface of the ground is alternately ridged or furrowed similar to the surface ridges, so that the deeper furrow is parallel with the furrow partially filled by the attachment on the opposite side of the ridge; and the attachment lister of special type only going part of the depth only partially splits the ridge and has a lesser furrow depth thus creating a sub-soil condition similar to the surface condition but alternated. These are features that appeal to all farmers and wheat growers and are known to be beneficial in these western lands and climate and embodied in a tool or combination of this kind fulfill a long felt want. Hence, the lister attachment is of special type, special size, for a special purpose, and designed to eliminate other tools and machinery and better accomplish the purposes of all of them.

The construction of lister attachment with small diamond listers as referred to, will act upon the ridges formed by the larger plows 5 in such a manner as to leave five very small furrows and place the ground in condition to avoid blowing and shifting and making it easy to follow with the drill for planting, and furthermore the ground will be prepared in one operation for wheat planting. Then again the small furrows will permit of turning at the end of the field for the purpose of splitting adjoining ridges, and it is thought that the many advantages of a lister attachment, in accordance with this invention and for the purpose set forth, can be readily understood as it avoids sledding, other ridge busting devices and harrowing, and although an operative embodiment of the invention is described and illustrated, yet it is to be understood that changes in the details of construction can be had which will fall within the scope of the invention as claimed.

What we claim is:—

1. A lister attachment for the purpose set forth comprising a combined extension and coupling element adapted to be positioned against and project rearwardly from the back of the frame of the lister with which the attachment is associated, said element of a length to project from each side of such frame, means for detachably connecting said element to said frame, a plurality of spaced beams connected at their forward ends to and projecting rearwardly and downwardly from said element, a plow carried by the rear end of each of said beams and arranged in spaced relation rearwardly and laterally with respect to the plows of the lister, and rearwardly and downwardly extending brace elements interposed between and connected at their rear ends to said beams and further having their forward ends connected to said combined extension and coupling element.

2. A lister attachment for the purpose set forth comprising a combined extension and coupling element adapted to be positioned against and project rearwardly from the back of the frame of the lister with which the attachment is associated, said element of a length to project from each side of such frame, means for detachably connecting said element to said frame, a plurality of spaced beams connected at their forward ends to and projecting rearwardly and downwardly from said element, a plow carried by the rear end of each of said beams and arranged in spaced relation rearwardly and laterally with respect to the plows of the lister, and rearwardly and downwardly extending brace elements interposed between and connected at their rear ends to said beams and further having their forward ends connected to said combined extension and coupling element, each of said brace elements being of V-shape contour and common to a pair of beams.

In testimony whereof, we affix our signatures.

WILLIAM J. HOLMAN.
GEORGE L. HAYWARD.